(12) United States Patent
Smith et al.

(10) Patent No.: US 11,076,172 B2
(45) Date of Patent: *Jul. 27, 2021

(54) REGION-OF-INTEREST ENCODING ENHANCEMENTS FOR VARIABLE-BITRATE COMPRESSION

(71) Applicant: WARNER BROS. ENTERTAINMENT INC., Burbank, CA (US)

(72) Inventors: Michael Smith, Hermosa Beach, CA (US); Bradley Collar, Valencia, CA (US)

(73) Assignee: WARNER BROS. ENTERTAINMENT INC., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/714,726

(22) Filed: Dec. 14, 2019

(65) Prior Publication Data

US 2020/0228841 A1 Jul. 16, 2020

Related U.S. Application Data

(63) Continuation of application No. 15/688,523, filed on Aug. 28, 2017, now Pat. No. 10,511,861, which is a
(Continued)

(51) Int. Cl.
*H04N 19/136* (2014.01)
*H04N 19/64* (2014.01)
*H04N 19/147* (2014.01)
*H04N 19/14* (2014.01)
*H04N 19/186* (2014.01)
*H04N 19/154* (2014.01)
(Continued)

(52) U.S. Cl.
CPC .......... *H04N 19/647* (2014.11); *H04N 19/12* (2014.11); *H04N 19/136* (2014.11); *H04N 19/14* (2014.11); *H04N 19/147* (2014.11); *H04N 19/154* (2014.11); *H04N 19/17* (2014.11); *H04N 19/176* (2014.11); *H04N 19/182* (2014.11); *H04N 19/186* (2014.11)

(58) Field of Classification Search
CPC .. H04N 19/115; H04N 19/124; H04N 19/136; H04N 19/17
See application file for complete search history.

(56) References Cited

U.S. PATENT DOCUMENTS

| 6,151,360 | A | * | 11/2000 | Kato | .................... | H04N 19/176 375/240.03 |
| 2002/0063801 | A1 | * | 5/2002 | Richardson | ............ | H04N 9/646 348/589 |

(Continued)

*Primary Examiner* — Jeremiah C Hallenbeck-Huber
(74) *Attorney, Agent, or Firm* — One LLP; Jonathan Jaech

(57) ABSTRACT

A specification defining allowable luma and chroma code-values is applied in a region-of-interest encoding method of a mezzanine compression process. The method may include analyzing an input image to determine regions or areas within each image frame that contain code-values that are near allowable limits as specified by the specification. In addition, the region-of-interest method may comprise then compressing those regions with higher precision than the other regions of the image that do not have code-values that are close to the legal limits.

20 Claims, 7 Drawing Sheets

---

600

602 Analyzing an Input Image to Identify Pixels with Code-values Near Allowable Limits According to a Color Space Specification

604 Defining a Region-of-interest Within Input Image Based on Pixel Code-values Near Specified Allowable Limits

606 Encoding Input Image with Higher Precision in Areas Corresponding to Defined Region-of-interest than in Areas not Corresponding to the Defined Region of Interest, Using Wavelet-based Compression to Provide Compressed Image Data

Related U.S. Application Data continuation of application No. 15/174,765, filed on Jun. 6, 2016, now Pat. No. 9,749,659, which is a continuation of application No. 13/096,405, filed on Apr. 28, 2011, now Pat. No. 9,363,522.

(51) Int. Cl.
*H04N 19/17* (2014.01)
*H04N 19/12* (2014.01)
*H04N 19/176* (2014.01)
*H04N 19/182* (2014.01)

(56) References Cited

U.S. PATENT DOCUMENTS

| | | | | |
|---|---|---|---|---|
| 2003/0198391 | A1* | 10/2003 | Fukuhara | H04N 19/119 382/232 |
| 2005/0100229 | A1* | 5/2005 | Becker | H04N 19/147 382/232 |
| 2009/0245587 | A1* | 10/2009 | Holcomb | H04N 19/14 382/108 |
| 2009/0324113 | A1* | 12/2009 | Lu | H04N 19/103 382/234 |
| 2011/0026607 | A1* | 2/2011 | Bhagavathy | G06T 5/20 375/240.26 |
| 2011/0135012 | A1* | 6/2011 | Li | G06T 7/0002 375/240.29 |
| 2011/0249736 | A1* | 10/2011 | Segall | H04N 19/44 375/240.12 |

* cited by examiner

| TABLE 2 - Digital Representation According to Rec.709 |||||||||||
|---|---|---|---|---|---|---|---|---|---|---|
| Item | Parameter | System Values |||||||||
| | | 60/P | 30/P | 30/PsF | 60/I | 50/P | 25/P | 25/PsF | 50/I | 24/P | 24/PsF |
| 5.1 | Coded Signal | R, G, B or Y, $C_B$, $C_R$ ||||||||||
| 5.2 | Sampling Lattice<br>– R, G, B, Y | Orthogonal, Line and Picture Repetitive ||||||||||
| 5.3 | Sampling Lattice<br>– $C_B$, $C_R$ | Orthogonal, Line and Picture Repetitive Co-sited with Each Other and with Alternate[1]<br>Y Samples ||||||||||
| 5.4 | Number of Active Samples per Line<br>– R, G, B, Y<br>– $C_B$, $C_R$ | 1920<br>960 ||||||||||
| 5.5 | Coding Format | Linear 8 or 10 Bits/Component ||||||||||
| 5.6 | Quantization Levels<br><br>– Black Level<br>  R, G, B, Y<br>– Achromatic<br>  $C_B$, $C_R$<br>– Nominal Peak<br>  – R, G, B, Y<br>  – $C_B$, $C_R$ | 8-bit Coding |||||| 10-bit Coding ||||
| | | 16<br><br>128<br><br><br>235<br>16 and 240 |||||| 64<br><br>512<br><br><br>940<br>64 and 960 ||||
| 5.7 | Quantization Level Assignment<br>– Video Data<br>– Timing Reference | 8-bit Coding<br>1 Through 254<br>0 and 255 |||||| 10-bit Coding<br>4 Through 1019<br>0-3 and 1020-1023 ||||
| 5.8 | Filter Characteristics[2]<br>– R, G, B, Y<br>– $C_B$, $C_R$ | See Fig. 14A<br>See Fig. 14B ||||||||||
| (1) The First Active Color-difference Samples being Co-sited with the First Active Luminance Sample.<br>(2) These Filter Templates are Defined as Guidelines. |||||||||||

```
#define GAMUTPROTECT_PROTECT 1
#define GAMUTPROTECT_NOPROTECT 0
int gamut_protect_init( unsigned char lut_y[1024], unsigned char lut_cbcr[1024] )
{
  memset( lut_y, GAMUTPROTECT_NOPROTECT, 1024 );
  memset( lut_cbcr, GAMUTPROTECT_NOPROTECT, 1024 );
  // y low
  for( int y = 64; y < (64 + 12); y++ )
  {
    lut_y[y] = GAMUTPROTECT_PROTECT;
  }
  // y high
  for( int y = (940 - 12); y <= 940; y++ )
  {
    lut_y[y] = GAMUTPROTECT_PROTECT;
  }
  // cbcr low
  for( int cbcr = 64; cbcr < (64 + 4); cbcr++ )
  {
    lut_cbcr[cbcr] = GAMUTPROTECT_PROTECT;
  }
  // cbcr high
  for( int cbcr = (960 - 4); cbcr <= 960; cbcr++ )
  {
    lut_cbcr[cbcr] = GAMUTPROTECT_PROTECT;
  }
  return 0;
}
```

```
#define GAMUTPROTECT_PROTECT 1
#define GAMUTPROTECT_NOPROTECT 0
// open input file
DpxReader dpx_reader;
dpx_reader.open_dpx_file( input_filename );

// get input file dimensions and prepare region of interest memory and input line buffer
unsigned int width = dpx_reader.get_width();
unsigned int height = dpx_reader.get_height ();
unsigned int number_of_components = dpx_reader.get_number_of_components();
unsigned char *output_image_buf_nonaligned = NULL;
unsigned char *output_image_buf = allocate_uint8_array( output_image_buf_nonaligned, width*height );
unsigned char *line_buf_unaligned = NULL;
unsigned short *line_buf = allocate_uint16_array( line_buf_unaligned, width );

// initialize near 'legal' code-value lookup table
gamut_protect_init( gamutprotect_lut_y, gamutprotect_lut_cbcr );

//read lines from input image and process with look up table
for( unsigned int line_number = 0; line_number < height; line_number++ )
{
  for( unsigned int c = 0; c < number_of_components; c++ )
  {
   dpx_reader.read_line( line_number, line_buf, c );

// walk through samples in the line to determine if the samples are near the gamut boundary
   unsigned char *output_pixel_ptr = &(output_image_buf[ width * line_number ]);
   if( c == 0 )
   {
    //Y
    for( unsigned int sample_index = 0; sample_index < width; sample_index++ )
    {
     unsigned char protect = gamutprotect_lut_y[ (line_buf[sample_index] & 0x03FF) ];
     if( protect == GAMUTPROTECT_PROTECT )
     {
```

FIG. 8A

```
        // check if this input pixel is already in the region of interest, if not, included it
        if( protect != output_pixel_ptr[sample_index] )
        {
          output_pixel_ptr[sample_index] = protect;
        }
      }
    }
  }
  else if( (c == 1) || (c == 2) )
  {
    // Cb or Cr
    for( unsigned int sample_index = 0; sample_index < (width/2); sample_index++ )
    {
      unsigned char protect = gamutprotect_lut_cbcr[ (line_buf[sample_index] & 0x03FF ) ];
      if( protect == GAMUTPROTECT_PROTECT )
      {
        // check if this input pixel is already in the region of interest, if not, included it
        if( protect != output_pixel_ptr[sample_index*2] )
        {
          output_pixel_ptr[sample_index*2] = protect;
          output_pixel_ptr[sample_index*2 + 1] = protect;
        }
      }
    }
  }
}
// close input file
dpx_reader.close_dpx_file();
// write binary region of interest image to PGM file for processing by JPEG2000 encoding process
pgm_write.write_8bit( output_image_buf, width, height, args.output_filename );
```

FIG. 8B

REGION-OF-INTEREST ENCODING ENHANCEMENTS FOR VARIABLE-BITRATE COMPRESSION

CROSS-REFERENCE TO RELATED APPLICATION

This application is a continuation of U.S. patent application Ser. No. 15/688,523, filed Aug. 28, 2017, now U.S. Pat. No. 10,511,861, which is a continuation of U.S. patent application Ser. No. 15/174,765, filed Jun. 6, 2016, now U.S. Pat. No. 9,749,659, which is a continuation of U.S. patent application Ser. No. 13/096,405, filed Apr. 28, 2011, now U.S. Pat. No. 9,363,522, the disclosures of which are hereby incorporated by reference, in their entireties.

FIELD

The present disclosure relates to a system and method for digitally encoding audio-video data.

BACKGROUND

Audio-video content, for example motion picture feature films, is often distributed in different encoding formats through various different distribution channels and on different digital media. Prior to distribution, video master data is maintained on the distribution side for creating compressed versions for distribution to end users. In the case of high-definition (HD) video data, master video data for large content files such as feature films may be large enough, for example about one terabyte (1000 gigabytes), to be subject to system storage or bandwidth limitations.

Therefore, "mezzanine compression" may be used to compress video master data. As used herein, "mezzanine compression" refers to a compression process used to create an intermediate electronic master ("eMaster") file. The resulting electronic master file is considered intermediate because it is often not the final video compression that is applied to the video signal to be ultimately delivered to the consumer or customer, and is compressed less than end user files. As such, mezzanine compression is a mild compression that should not reduce the image quality of any of the downstream deliverables. For example, mezzanine compression ratios are typically in the range of about 3:1 to 15:1. This means, for example, instead of requiring 833 gigabytes to encode a 2-hour HD raw video master, an 2-hour HD eMaster using a 3:1 compression ratio requires 833/3=277 gigabytes, while a 2-hour HD eMaster using a 15:1 compression ratio requires 833/15=55 gigabytes. Mezzanine compression reduces storage requirements and also reduces the transfer bandwidth requirements of the eMaster since less data is transmitted over high-speed networking equipment.

Wavelet compression, for example compression according to the Joint Photographic Experts Group ("JPEG") 2000 standard, may be suitable for mezzanine compression to produce eMaster files. However, the JPEG 2000 or similar wavelet compression methods may be subject to certain disadvantages when used for mezzanine compression, which demands a higher level of precision and accuracy than compression for end-use applications. For example, wavelet compression methods may be subject to ringing artifacts or other imprecision near luma or chroma limits of the image, which may appear as blurriness or discoloration in certain image areas.

Therefore, it would be desirable to provide a method or system for improving wavelet compression or other compression methods with similar disadvantages, that overcomes these and other limitations of the prior art.

SUMMARY

The present technology, therefore, provides an improved method for compression, which should be useful for motion picture mezzanine compression and other image processing applications.

Code-values that make up an encoded raw video image will generally conform to a specified range of allowable values. The range of allowable values is generally defined by an applicable image specification. For example, an allowable range for 10-bit luma (Y') code-values may be specified as 64-940 inclusive. An allowable range for 10-bit chroma (Cb/Cr) code-values may be specified as 64-960 inclusive. It is desirable that the eMaster mezzanine compression preserve this legal range of the code-values that make up the raw video master. As used herein, "illegal" code-values refer to code-values outside an applicable specified allowable range, for example 0-63 and 941-1023 for luma (Y') code-values or 0-63 and 961-1023 for chroma (Cb/Cr) code-values, depending on the applicable specification. Such limits may be useful, for example, because of limits in image capture or display hardware, which may not be capable of capturing and/or displaying pixel values outside of the specified range.

A region-of-interest encoding technique is disclosed, which includes certain additional operations in the mezzanine compress. For example, an image processor is used to analyze the input image to determine regions or areas within each image frame that contain code-values that are illegal or near the allowable limits specified by an applicable specification. Nearness may be defined in various ways, for example, "within X % of a range limit," wherein "X" may be a number in the range of about 0.01 to 10. Each of these regions or image areas is referred to herein as a "region-of-interest," and in plural as the "regions of interest." The boundaries of each region-of-interest may be selected in any manner compatible with the compression method to be used. After having defined the regions of interest, an image processor is used to compress the regions of interest with higher-precision than the other regions of the image that do not have code-values that are close to the legal limits.

This region-of-interest encoding technique can be used with both constant bit rate ("CBR") and variable bit rate ("VBR") encoding techniques for both intra-frame-only style compression and long group-of-picture "GOP" compression. This region-of-interest encoding technique may be applied, for example, to JPEG2000 compression or H.264 I-frame only compression. In a variable-bitrate region-of-interest encoding, the bit rate is increased to improve the quality of the region-of-interest areas, rather than keeping the bit rate fixed and degrading the quality of the non-region-of-interest image areas. Conversely, in a constant bit rate application the total number of bits is held constant, and therefore image quality may be degraded outside of the region-of-interest. Because of better overall image quality, VBR may be preferred for applications where bandwidth supports greater video fidelity.

Further details and features of the present technology are described in the detailed description that follows.

DESCRIPTION OF DRAWINGS

FIG. 1 is a system diagram showing a system for mezzanine compression.

FIGS. 2 and 3 are tables showing respective examples of color space specifications.

FIG. 7 is an example of source code for initializing the lookup tables defining region-of-interest corresponding to near-legal code-values.

FIGS. 8A and 8B show an example of source code for generating and combining of region-of-interest binary images.

In the detailed description that follows, like element numerals are used to describe like elements appearing in one or more of the figures.

DETAILED DESCRIPTION

Figures 1, 2:
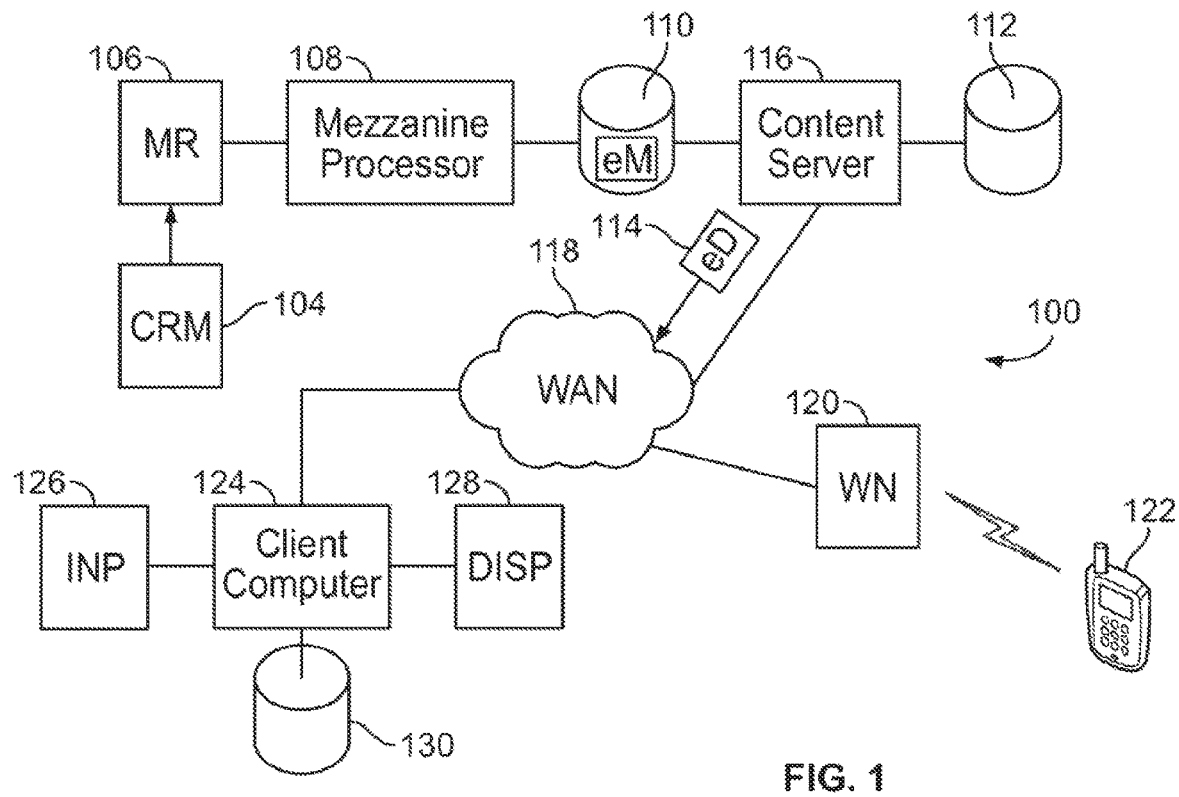

An example of a Digital-End-to-End infrastructure 100 for digital distribution of video content in shown in FIG. 1. The infrastructure 100 may include an intermediate digital servicing file for a digital servicing vault, also called an HD eMaster, representing a High-Definition (HD) Home Video Master. In an embodiment, original video content may be mastered to digital video tape 104 or other computer-readable medium, for example in the Sony HDCAM-SR format to create a HD Home Video Master Tape encoding an HD Home Video Master. To create an HD eMaster, a digital copy of the HD Home Video Master Tape 104 may be played back by a tape machine 106 or other media reader and input into a computer 108, where it may be encoded with mezzanine compression to create the HD eMaster 102. The HD eMaster 102 may then be stored in the digital vault, which may comprise a large file storage system comprising many hard drives, data-tape storage machines, and very high-speed data networking technologies. In the future, the HD Home Video Master may not be assembled and mastered on tape like it is today. In that case, the HD Home Video Master may be input to a computer without using a tape deck.

In response to a client request for a copy of particular video content that exists within the eMaster digital vault 110, the HD eMaster may be copied from the digital eMaster vault onto temporary hard-drive storage 112 via a high-speed network transfer. Different clients often have different requirements for the format of the video content to be delivered to them. The digital file 114 that is transmitted to the destination client 124 may be called an "eDub". The formats of the eDubs can vary widely among different clients. Some examples of the eDub format parameters that may vary include the following: resolution, interlace/progressive, closed captions and/or Time-Code on the Vertical Blanking Interval (VBI) of an NTSC or PAL formatted video, logo-insertion, letterboxing, cropping, horizontal squeeze to fit a 16:9 aspect ratio image format within a 4:3 aspect ratio image container format, bit-depth, dithering technique, insert/remove commercial blacks, color-space conversion, and other format changes. In addition, a file format may be specified, which may require further compression of the eMaster 102 to prepare the eDub 114.

Therefore, a content processing operation may be performed by a file server 116 or other computer to format the eMaster 102 according to the requirements determined for or specified by the client 124. Most often, a second video compression process is applied to a content-formatted video signal prepared using an image processor 116. If a second video compression process is applied, then additional parameters related to the second video compression may also be specified, for example video compression format/standard, video compression bitrate statistics like average/peak bitrates, intra-frame-only vs. long-GOP (intra-and-inter-frame) compression, among other things. If the client 124 does not require a second video compression, the file server 116 may transmit a copy of the eMaster 102, or the formatted video data generated from the eMaster as uncompressed data. In this case, the recipient may apply a second video compression process before delivering to a downstream end-user client 124. These examples illustrate why video compression used by the video processor 108 to create the HD eMaster 102 is called a mezzanine compression, because it comes before a final video compression process, or is in the middle of potentially multiple video compression steps.

Currently, High Definition (HD) Home Video Master Tapes 104 are usually in Sony HDCAM-SR tape format or Panasonic HD D5 tape format. Standard Definition (SD) Home Video Master Tapes are usually in Sony Digi-Beta tape format. HD Home Video Master Tapes are played out of a HD tape deck, which is either a Sony HDCAM-SR tape deck or a Panasonic HD D5 tape deck. The tape deck 106 may be connected to a computer's capture card utilizing the SMPTE-292 High Definition Serial Digital Interface (HD-SDI) standard. The computer may be equipped with a capture card that captures the video, audio and auxiliary data that is transmitted via the HD-SDI connection. The high definition image data flowing over the HD-SDI connection may conform to a format specified by SMPTE-274M 1920×1080 Image Structure. The frame-rate of HD Home Video Masters is often 23.976 frames per second (24/1.001=23.976). It is possible that other formats may be supported by the system sometime in the future, some example resolutions that may be supported are 1280×720, 2K, 4K, 6K, 8K, or Quad-HD with similar or alternate frame rates like 24 fps, 25 fps, 29.97 fps, 30 fps, 48 fps, 59.95 fps and 60 fps. Additionally, 3D (stereoscopic) and 3D (multiview) may also be supported in their native full-resolution, and 3D (stereoscopic) may also be supported in one of the many half-resolution formats, for example, side-by-side, over-under, line-interleave, column-interleave, checkerboard, or other formats.

The HD Home Video Master chroma format is often 4:2:2 but may also be 4:4:4 or 4:2:0. Additionally, the HD Home Video Master format is often in progressive frame format, while the SD Home Video Master format is often in interlaced frame format. It is also possible to use interlaced frame format for the HD Home Video Master format.

Each image frame in the video content comprises pixels that are used to represent the image content. In 4:2:2 format, for each horizontally adjacent two-pixel pair, there are two luma (Y') samples, one blue chroma (Cb) sample and one red chroma (Cr) sample. This averages to a sampling density of two samples per pixel. One suitable format currently used for HD Home Video masters is 1920×1080 10-bit 4:2:2 Rec.709. This means that each line of the image data contains 1920 samples of luma (Y'), 960 samples of the blue color-difference chroma channel (Cb) and 960 samples of the red color-difference chroma channel (Cr'), resulting in a total of 3840 samples per line (1920+960+960=3840). Each sample has 10-bits of sampling precision, so these 10-bit samples may be referred to as 10-bit code-values.

There are 1080 lines per frame, with each line consisting of 3840 samples. Thus, there are 1080 lines/frame×3840 samples/line=4,147,200 samples per frame. For HD Home Video Masters, each sample is represented by a 10-bit code-value, this results in 10-bits/sample×4,147,200 samples/frame=41,472,000 bits/frame. This results in 41,472,000 bits/frame×23.976 frames/second=994,332,672 bits/second. A HD Home Video Master may often contain, for example about 2 hours of video content. Continuing the example, this corresponds to 60 seconds/min*60 min/hour*2 hours=7,200 seconds in a typical HD Home Video Master. Thus, the video content of the example 2 hours HD Home Video Master requires 994,332,672 bits/second*7,200 seconds=7,159,195,238,400 bits in its uncompressed format. 7,159,195,238,400 bits is 894,899,404,800 bytes (1 byte=8 bits). If 1 gigabyte (GB) is 1,073,741,824 bytes (1024×1024×1024=1,073,741,824), then the example 2-hour HD Home Video Master in uncompressed format as recorded on the input medium 104 requires 833 gigabytes.

If each frame of the HD Home Video Master is compressed with a fixed compression ratio, then this leads to what is called a "constant bitrate" encoding. "Constant bitrate" (CBR) encoding means that the number of bytes used for each compressed frame of the HD Home Video Master within the eMaster is constant. For example, if each frame of the HD Home Video Master is compressed from 41,472,000 bits/frame to 4,147,200 bits/frame then this results in a 10:1 compression ratio, and results in a data rate of 4,147,200 bits/frame*23.976 frames/second=99,433,267 bits/sec 100 Megabits/second. Another way of describing this is that the encoding is 100 Megabits/second constant bitrate. For intra-frame-only compression, each frame is compressed independently from the other frames in the sequence. In long-GOP compression (which comprise both intra-frames and inter-frames), the frames are not compressed independently from the other frames in the sequence. The correlation between frames is exploited to improve the compression performance. In long-GOP compression, a constant bitrate encoding often refers to a compressed bitstream that achieves a constant average rate over a short time period (like 1 second, or a single group-of-pictures.

The image processor 108 may use JPEG2000 compression as described in ISO/IEC 15 444-1, 2000, to create the HD eMaster. In JPEG2000 compression, each frame is compressed independently from the other frames in the sequence, and thus is inherently an intra-frame-only style compression. When using JPEG2000 compression, the description "constant bitrate" encoding refers to the fact that each frame in the sequence uses a fixed number of bytes per frame as described above.

"Variable bitrate" (VBR) encoding is another type of encoding method that may be used in JPEG2000 compression. In VBR encoding for intra-frame-only style compression, each frame in the sequence is compressed independently from the other frames in the sequence and each frame in the sequence may be compressed with a different number of bytes per frame. VBR encoding for long-GOP style compression refers to the fact that each group-of-pictures segment may be compressed with a different number of bytes per GOP, additionally; individual frames within each GOP may be compressed with a different number of bytes.

Code values used to represent the video data that makes up the HD Home Video Master may generally be within a defined colorspace, which means range of values mapped to colors. This colorspace may be defined by a published specification, for example, one represented by the Recommendation ITU-R BT.709, which is often called "Rec.709". The Rec. 709 specification defines the range and level of the 10-bit code values and how these code values should be transformed into tristimulus values which ultimately cause different amounts of red, green and blue light to be emitted by a display device 128 which can be observed by a viewer. The Rec.709 specification also defines the range and levels of 8-bit code-values in addition to 10-bit code-values. The SMPTE-274M specification also defines similar ranges and levels of 8-bit, 10-bit and 12-bit code-values. The code-value corresponding to black and white are defined by these specifications, and also a range for overshoot and undershoot, above the white-level and below the black-level respectively. Additionally, minimum and maximum chroma (Cb/Cr) values are also defined by these specifications.

TABLE 1 as shown in FIG. 2 shows a data structure defining the black-level, white-level, minimum chroma-level, maximum chroma-level, overshoot and undershoot for the SMPTE-274M specification. TABLE 2 as shown in FIG. 3 shows a similar data structure for the Rec.709 specification. While in most cases, the HD Home Video Master contains pixel code-values that have already been through quality control and verified that they conform to the allowable limits defined by an applicable color space, it is possible for the HD Home Video Master to be mastered with values outside those allowable limits. In this document the term "legal" is used to denote code values that lie within the range as defined in the specification pertaining to the particular video signal in question. Likewise, the term "illegal" is used to denote code values that lie outside the range. Additionally, it is possible to use other color spaces for the HD Home Video Master like X'Y'Z' or xvYCC. The SD Home Video Master uses the Rec. 601 color space.

HD Home Video Masters are created to conform to these specifications shown in TABLE-1 and TABLE-2. As such, most of the code-values that make up the HD Home Video Master will conform to the legal range of the specifications shown in TABLE-1 and TABLE-2. For example, the legal range for 10-bit luma (Y') code-values is 64-940 inclusive. The legal range for 10-bit chroma (Cb/Cr) code-values is 64-960 inclusive. It is desirable that the eMaster compression preserve this legal range of the code-values that make up the HD Home Video Master, and avoid creating illegal code-values outside the allowable range, for example 0-63 and 941-1023 for luma (Y') code-values and 0-63 and 961-1023 for chroma (Cb/Cr) code-values.

Any suitable specification defining allowable code-values may be used in a region-of-interest encoding method. Such a method may include analyzing an input image to determine regions or areas within each image frame that contain code-values that are near allowable limits, for example, as specified by Rec.709 and/or SMPTE-274M. In addition, the region-of-interest method may comprise then compressing those regions with higher precision than the other regions of the image that do not have code-values that are close to the legal limits.

This region-of-interesting encoding technique can be used with both CBR and VBR encoding techniques for both intra-frame-only style compression and long-GOP compression. In particular, this region-of-interest encoding technique could be applied to JPEG2000 compression or H.264 I-frame only compression. Region-of-interest encoding techniques in the prior-art are often applied in low-bitrate compression applications, involving security, surveillance or mobile-wireless-transmission applications. Most region-of-interest encoding techniques in the prior art are applied to CBR encoding applications. In CBR region-of-interest encoding applications, the total number of bytes that can be used by the encoding is fixed, and the quality of the region-of-interest is improved while the quality of the non-region-of-interest areas in the image frame are compressed with degraded quality. Additionally, defining a region-of-interest based on visual-masking models is described in the prior-art.

In a variable-bitrate (VBR) region-of-interest encoding, the bitrate is increased to improve the quality of the region-of-interest areas, rather than keeping the bitrate fixed and degrading the quality of the non-region-of-interest image areas.

A short overview of the JPEG2000 compression paradigm is provided in the section below, for the convenience of the reader in better understanding the region-of-interest VBR encoding enhancements presently disclosed. The reader should refer to the full-standard for a complete description of the JPEG2000 compression algorithm.

Overview of JPEG 2000

Figure 4:
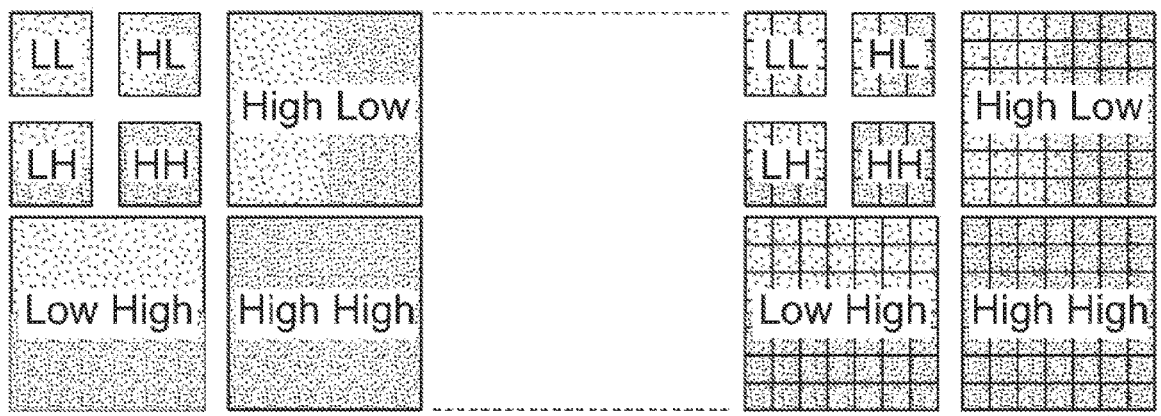
FIGS. 4 and 5 are diagrams illustrating aspects of wavelet-based compression pertinent to region-of-interest encoding.

A JPEG2000 encoder utilizes a wavelet transform to decompose an input image into spatial-frequency sub-bands. Each wavelet sub-band corresponds to a different spatial frequency range. Cascaded filtering with high and low frequency filters leads to different spatial frequency sub-bands. The two-dimensional wavelet-transform is used in JPEG2000, which results in spatial frequency ranges corresponding to low frequency, horizontal frequencies, vertical frequencies and diagonal frequencies In JPEG2000 encoding of HD images, usually a 5-level wavelet-transform is applied to the input image. After the 5-level wavelet transform is applied, the result is a set of 3*5+1=16 wavelet sub-bands. The wavelet sub-bands contain the wavelet coefficients. The wavelet coefficients within each wavelet sub-band are then grouped into small 32×32 or 64×64 blocks of spatially adjacent coefficients, as illustrated in FIG. 4.

The following description of JPEG2000 code-blocks, and rate-distortion is based on the text of an article written by Michael Smith and John Villasenor that appeared in the SMPTE Journal article, "JPEG-2000 Rate Control for Digital Cinema," SMPTE Motion Imaging Journal, Vol. 115, No. 10, pp. 394-399, October 2006.

The fundamental unit of data in the JPEG2000 compression standard is the code-block. A code-block is simply a spatial grouping of wavelet coefficients, which have size 32×32 or 64×64 for many applications. Each code-block is further decomposed into "fractional bit-planes". As the term implies, this decomposition is related to the bit planes in the binary representation of the quantized wavelet coefficients. There are typically three fractional bit-planes for each bit-plane in a code-block. The fractional bit-planes are compressed with a context adaptive arithmetic coder. Compressed fractional bit-planes are often called "coding-passes" and contain the actual bits that comprise a JPEG2000 codestream. For example, for a 1920×1080 4:2:2 10-bit HD image, decomposed using a 5-level discrete wavelet transform (DWT), there are approximately (1920/64)*(1080/64)+(960/64)*(1080/64)*2≈30*17+15*17*2=1020 code-blocks of size 64×64.

The number of coding passes per code block is a function of various factors including the quantization precision used. For example, in a case where there are on average 40 coding passes per code block, this means there are approximately 1020*40=40,800 coding passes that result from the HD image. If all the coding passes are retained in the output code-stream, lossless or nearly lossless compression will result, depending on the DWT filters used, because all the information is preserved. In contrast to a lossless compressor, a typical lossy compressor will discard a large number of coding passes. It is the lossy compressor's rate-control algorithm that specifically determines which of the many coding passes to include in the final output codestream and which of the many coding passes to discard.

A rate-distortion optimized compressor typically calculates an efficiency measure for each coding pass of each code-block. This efficiency measure is sometimes called "distortion-length slope." Each coding pass has a certain size, $\Delta L$, measured in bits or bytes. The inclusion of each coding pass reduces the resulting image distortion by an amount $\Delta D$. The quantities $\Delta L$ and $\Delta D$ are used to calculate the distortion-length slope of the coding pass, $S=\Delta D/\Delta L$. The distortion-length slope is essentially a measure of the efficiency of the bits in that particular coding pass in reducing distortion. The distortion-length slope is calculated for each coding pass of each code-block. JPEG2000 places some restrictions on the order in which coding passes can be included, assuring, for example, that the less significant bits of a coefficient are not placed in the codestream before the more significant bits.

Given this framework, the two traditional methods for rate control are often referred to as efficiency-based and rate-based. A rate-based rate-control algorithm specifies a target size for the output codestream, L. The coding passes with the steepest distortion-length slopes are included before including other coding passes with lower distortion-length slope. Coding passes are included in this manner until the target size, L, is met. This results in an output code-stream that meets specific length goals.

An efficiency-based rate-control algorithm specifies a certain distortion-length slope threshold, $S_{threshold}$, and all coding passes with a steeper slope than $S_{threshold}$ are included in the output codestream. Determining the appropriate $S_{threshold}$ for image sequences subject to buffer constraints may be performed in any suitable way as known in the art. This approach assures that all coding passes that have efficiency greater than the threshold are included.

The rate-based method described above achieves a constant bitrate encoding if the same rate target is used for each frame in the video sequence. The efficiency-based method described above achieves a variable bitrate encoding if the slope-threshold is kept fixed for all frames in the sequence (because the number of coding passes that have a efficiency greater than the slope-threshold will vary depending on the image content). In general, more complicated frames will have more coding passes with a slope value above the slope-threshold and thus more coding passes from these complicated frames will be included in the final code-stream, thereby increasing the bitrate for these complicated frames. Simple frames will have more coding passes below the slope-threshold and thus will have fewer coding passes included in the final code-stream, which will decrease the bitrate for these simple frames.

Region-of-Interest Enhanced Encoding

In region-of-interest enhanced encoding, a region-of-interest for encoding enhancement within the input image is defined as a region that contains code-values near the legal limits. Once this spatial area in the input image is defined, the code-blocks that are contained within this region-of-interest are identified, and then the distortion reduction ΔD for all the coding passes within the identified code-blocks contained within the region-of-interest is increased by a factor "$w_{legal}$" that is greater than 1. The effect of increasing the distortion reduction by a factor $w_{legal}$ that is greater than 1 is that these coding passes will have an increased distortion-length slope S=, $(\Delta D^* w_{legal})/\Delta L$. In other words, with the weighting factor $w_{legal}$, the numerator is increased but the denominator is not increased, so the resulting fraction representing the distortion-length slope will increase.

In the post-compression rate distortion optimization (PCRD-opt) step of the JPEG2000 encoding process, this will result in the areas containing the region-of-interest code-blocks to be represented with higher precision because more of the coding-passes within that code-block will be included in the final output code-stream. In other words, "compressing with higher precision" as applied to a region-of-interest and in the context of the present disclosure, can be performed by causing a proportionally higher fraction of coding passes to be included in the final output stream, relative to lower-precision image area outside of the region-of-interest. Because the region-of-interest is defined as containing areas in the input image that have code-values near the allowable limits, the chances of the JPEG2000 compression introducing distortion that causes the decoded code-values to go into the illegal range is drastically reduced.

Figure 5:
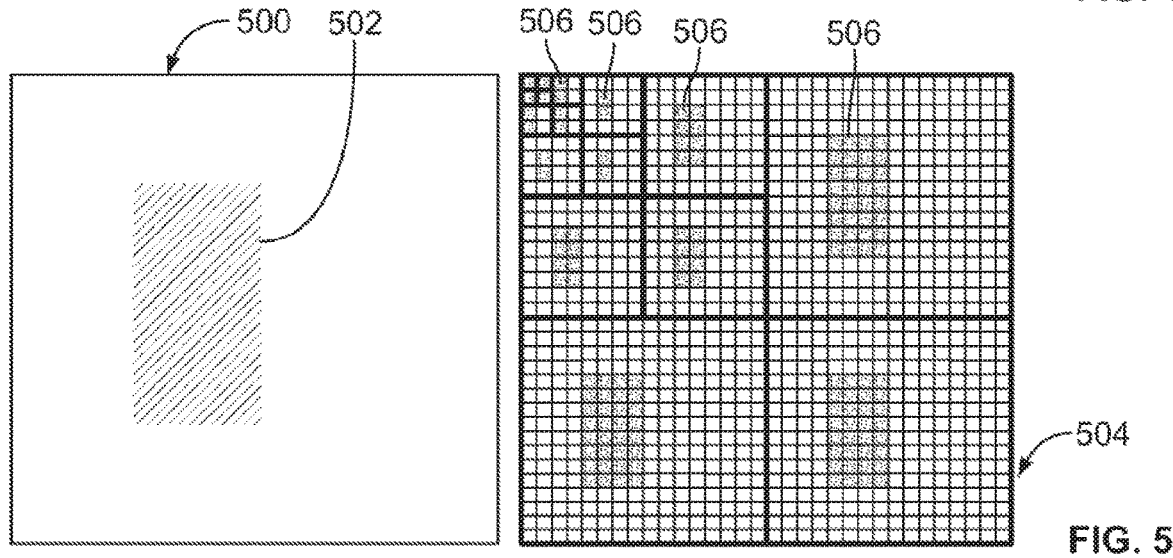

FIG. 5 illustrates a spatial relationship between a region-of-interest 502 in an input image 500, and the spatial locations within the wavelet sub-bands 504 and code-blocks that correspond to this region-of-interest in the input image. The region-of-interest 502 in the input image 500 is shown in cross-hatch on left; on the right, the code-blocks 506 in the wavelet transform sub-bands 504 that correspond to the region-of-interest are shown in gray.

If the code-block size is decreased, from 64×64 to 32×32, then the region-of-interest can be more granular and more sharply defined. Decreasing the code-block size may result in a decrease in the amount of bits required to represent the region-of-interest defined by the code-values near the legal range. However, a drawback of using a smaller code-block size may be that the compression is not as efficient, because the context used by the context adaptive binary arithmetic encoder is smaller and therefore the probability models associated with each context likely won't be as adapted to the code-block data being coded. Smaller code-block sizes like 16×16, 8×8 can also be used, as well as non-square code-block sizes 64×32, 32×64, 32×16, 16×32, 128×32, 256×16, and so forth.

Figure 6:
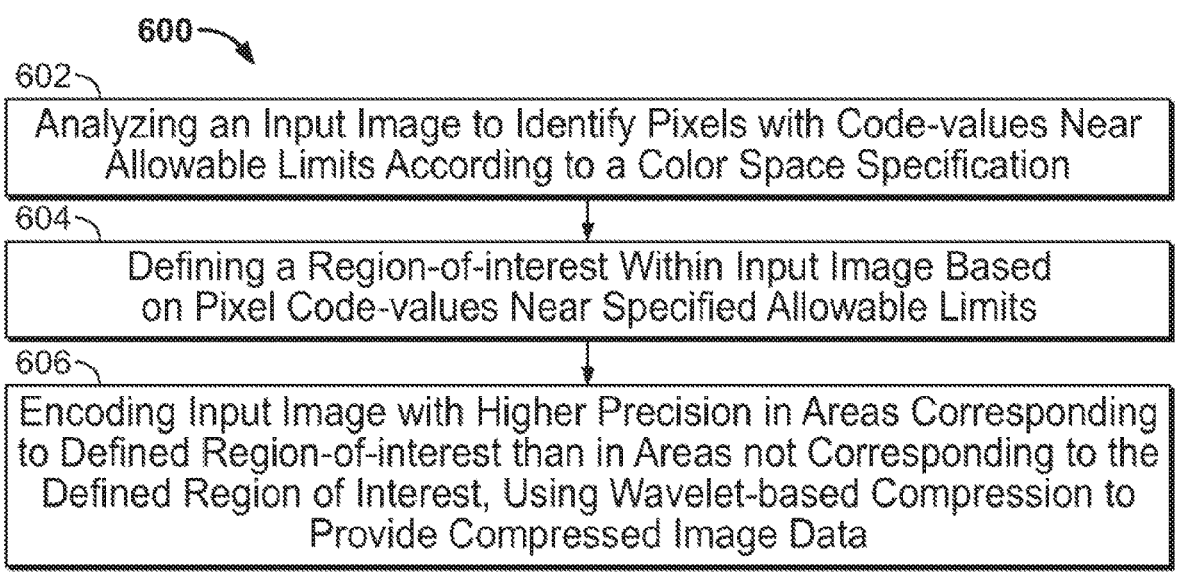
FIG. 6 is a flow chart showing a method for providing compressed image data, using region-of-interest encoding with differential precision encoding responsive to a color space specification.

In an embodiment, a computer configured to perform a wavelet compression algorithm, for example an algorithm according to JPEG2000 encoding, may be modified using any suitable software or hardware to perform operations of a method 600 as shown in FIG. 6. Initially, a computer/image processor may capture a high-definition input image (for example, a 1920×1080 4:2:2 10 bit image) using an HD-SDI capture card or other suitable hardware. At 602, the computer may analyze input image code-values to identify pixels with code-values near allowable limits according to a color space specification. At 604, the image processor may define one or more input image locations making up a "region-of-interest" that will be encoded with higher precision as containing all such code-values. The amount of tolerance used to specify the closeness to the legal code-value range may be varied per color component. For the specified example conditions, code-values that are within 12 code-values from the legal limits for the luma (Y') code-values may be considered to be near the legal luma limits, and within 4 code-values from the legal limits for the chroma (Cb/Cr) code-values may be considered to be near the chroma limits.

In a more detailed aspect, the defining operation 604 may comprise creating a binary data file comprising bits corresponding to respective pixels of the input image. For example, for a 1920×1080 pixel input image, the computer may create a 1920×1080 binary image using the following procedure:

a. Create a 1920×1080 binary region-of-interest image initialized to 0 (or 1).

b. For each pixel in the input image, determine if the code-values corresponding to that pixel are near the legal limit by performing a look-up table analysis on the input image code-values. If the input image at the pixel has code-value near the legal limit, then the binary region-of-interest sample for the pixel is set to 1, otherwise it is set to 0. Example look-up tables are shown in Table 3 and Table 4 for Y and Cb/Cr color planes respectively.

Table 3 is a lookup table showing near legal limit code-values for luma (Y') color channel. The binary region-of-interest value is 1 when the code-value is in the range defined to be "near legal."

TABLE 3

| Luma (Y') 10 bit code-value | Binary region-of-interest value |
|---|---|
| 0 to 63 | 0 |
| 64-black level | 1 |
| 65 to 76 | 1 |
| 77 to 931 | 0 |
| 932 to 939 | 1 |
| 940-white level | 1 |
| 941 to 1023 | 0 |

Table 4 is a lookup table showing near legal limit code-values for chroma (Cb/Cr) color channels. The binary region-of-interest value is 1 when the code-value is in the range defined to be "near legal."

TABLE 4

| Chroma (Cb/Cr) 10 bit code-value | Binary region-of-interest value |
|---|---|
| 0 to 63 | 0 |
| 64-min chroma level | 1 |
| 65 to 68 | 1 |
| 69 to 955 | 0 |
| 956 to 959 | 1 |
| 960-max chroma value | 1 |
| 961 to 1023 | 0 |

By way of example only, source code 700 for initializing the lookup tables defining region-of-interest corresponding to near-legal code-values is shown in FIG. 7.

Because the HD Home Video Master image has a 4:2:2 sampling structure, each pair of horizontally adjacent pixels contain 2 luma (Y') samples, 1 blue/yellow chroma (Cb) sample and 1 red/green chroma (Cr) sample. While processing the chroma color planes with the look-up table to determine if the code-values in the chroma channels are near the legal minimum and/or maximum chroma levels, the region-of-interest binary value affects two horizontally adjacent pixels in the region-of-interest binary image, not just one because of the 4:2:2 sampling structure. By way of example only, source code 800 showing the generation and combining of the region-of-interest binary images is shown in FIG. 8.

Referring again to FIG. 6, after the region-of-interest is defined, the computer may encode 606 the input image with higher precision in areas corresponding to defined region-of-interest than in areas not corresponding to the defined region-of-interest, using a compression method, for example, wavelet-based compression as specified in JPEG2000, or H.264, to provide compressed image data. For example, to achieve differential precision encoding, the image processor may increase the distortion reduction ΔD for all the coding passes within the identified code-blocks contained within the region-of-interest by a factor that is greater than 1. The image processor may also determine how many coding passes to keep from each code-block during a Post Compression Rate Distortion Optimization (PCRD-opt) step of the encoding process 606. The image processor may vary the number of coding passes that are kept in each code-block according the rate-distortion statistics of the coding passes. The effect of increasing the distortion reduction by the factor greater than 1 is that these coding passes will have an increased distortion-length slope. The image processor may determine what distortion-length slope threshold meets the rate-control requirements, and then includes all the coding-passes that have a distortion-length slope greater than the determined distortion-length slope threshold. The image processor may compile compressed image data for successive video frames to prepare a mezzanine compressed video file.

Figure 9:
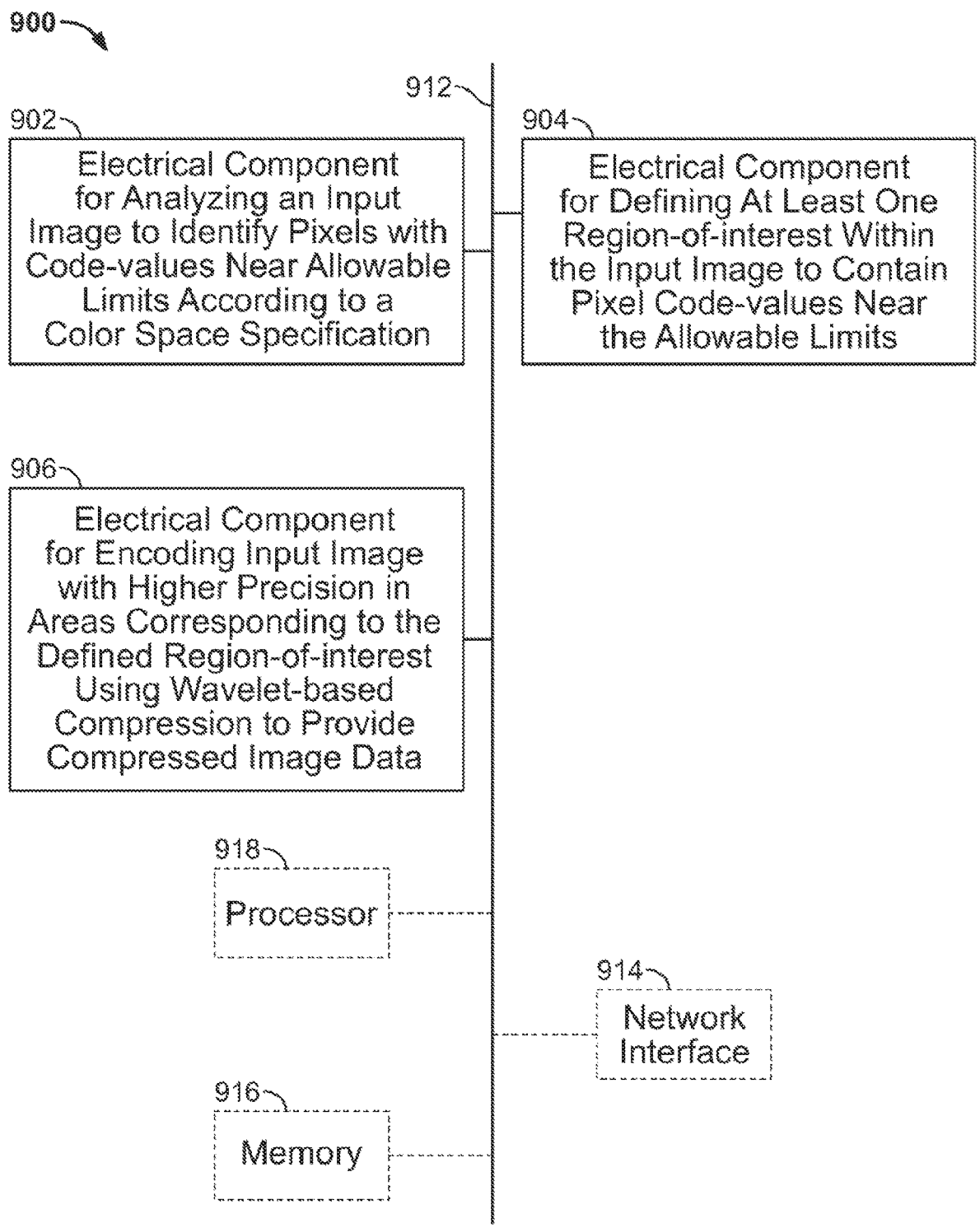
FIG. 9 is a diagram showing an apparatus for providing compressed image data, using region-of-interest encoding with differential precision encoding responsive to a color space specification.

Consistent with method 600, and as further illustrated by FIG. 9, an apparatus 900 may function as an image processor. The apparatus 900 may comprise an electronic component or module 902 for analyzing an input image such as, for example, a frame of an HD Home Video Master, to identify pixels with code-values near allowable limits according to a color space specification. The apparatus 900 may comprise an electronic component or module 904 for defining at least one region-of-interest within the input image responsive to the analysis component 902 to contain pixel code-values near the allowable limits. In addition, the apparatus 900 may comprise an electronic component or module 906 for encoding the input image with higher precision in areas corresponding to the defined region-of-interest than in areas not corresponding to the defined region-of-interest, using a compression method algorithm, to produce compressed image data. The compression method may comprise, for example, a wavelet based method such as JPEG 2000, or H.264.

The apparatus 900 may optionally include a processor module 918 having at least one processor; in the case of the apparatus 900 this may be configured as an image processor, rather than as a general-purpose microprocessor. The processor 918, in such case, may be in operative communication with the modules 902-906 via a bus 912 or similar communication coupling. The processor 918 may effect initiation and scheduling of the processes or functions performed by electrical components 902-906.

In related aspects, the apparatus 900 may include a network interface module 914 through with the processor 918 may send and receive information to clients and other servers. In further related aspects, the apparatus 900 may optionally include a module for storing information, such as, for example, a memory device/module 916. The computer readable medium or the memory module 916 may be operatively coupled to the other components of the apparatus 900 via the bus 912 or the like. The memory module 916 may be adapted to store computer readable instructions and data for effecting the processes and behavior of the modules 902-906, and subcomponents thereof, or the processor 918, or the methods disclosed herein, and other operations for content identification, playing, copying, and other use. The memory module 916 may retain instructions for executing functions associated with the modules 902-908. While shown as being external to the memory 916, it is to be understood that the modules 902-906 may exist at least partly within the memory 916.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or medium.

Having thus described a preferred embodiment of a system and method for mezzanine compression using region-of-interest encoding sensitive to luma and chroma limits, it should be apparent to those skilled in the art that certain advantages of the within system have been achieved. The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. For example, a method and system for use with a 4:2:2 sampling structure and JPEG2000 has been described, but it should be apparent that the novel concepts described above may be applied by one of ordinary skill to other types of input images and other compression methods to thereby realize the benefits described herein.

What is claimed is:

1. A computer-implemented method comprising:
    defining, by at least one hardware processor, at least one region-of-interest within an input image based on containing one or more near-limit pixels, the near-limit pixels having a luma code-value within a color space by no more than a defined number of luminance units that is less than a luminance range of the color space or having a chroma code-value within the color space by no more than a defined number of chroma units that is less than a chroma range of the color space, wherein the at least one region-of-interest includes all the one or more near-limit pixels in the input image; and
    encoding, by the at least one hardware processor, the input image with higher precision in the at least one region-of-interest using a compression method to provide compressed image data.

2. The method of claim 1, wherein the defining further comprises creating a data set comprising bits encoding luma code-values and chroma code-values for pixels in the region-of-interest, and further comprising setting the bits of the data set whereby each of the bits indicates whether a corresponding pixel of the input image is within the color space by no more than the defined number of luminance units and the defined number of chroma units.

3. The method of claim 1, further comprising compiling compressed image data for successive video frames to prepare a compressed video file.

4. The method of claim 1, wherein encoding the input image further comprises selectively increasing distortion reduction for all coding passes within code-blocks contained within the region-of-interest by a factor that is greater than 1.

5. The method of claim 1, wherein encoding the input image further comprises determining a threshold for distortion-length slope to meet a defined rate-control requirement, and selectively including coding passes that have a distortion-length slope greater than the determined distortion-length slope threshold to comprise the encoding.

6. An apparatus comprising at least one processor coupled to a memory, wherein the memory holds instructions that when executed by the least one processor cause the apparatus to perform:
    defining at least one region-of-interest within an input image based on containing one or more near-limit pixels, the near-limit pixels having a luma code-value within a color space by no more than a defined number of luminance units that is less than a luminance range of the color space or having a chroma code-value within the color space by no more than a defined number of chroma units that is less than a chroma range of the color space, wherein the at least one region-of-interest includes all the one or more near-limit pixels in the input image; and
    encoding the input image with higher precision in the at least one region-of-interest using a compression method to provide compressed image data.

7. The apparatus of claim 6, wherein the memory holds further instructions for the defining at least in part by creating a data set comprising bits encoding luma code-values and chroma code-values for pixels in the region-of-interest, and for setting the bits of the data set whereby each of the bits indicates whether a corresponding pixel of the input image is within the color space by no more than the defined number of luminance units and the defined number of chroma units.

8. The apparatus of claim 6, wherein the memory holds further instructions for compiling compressed image data for successive video frames to prepare a compressed video file.

9. The apparatus of claim 6, wherein the memory holds further instructions for encoding the input image at least in part by selectively increasing distortion reduction for all coding passes within code-blocks contained within the region-of-interest by a factor that is greater than 1.

10. The apparatus of claim 6, wherein the memory holds further instructions for encoding the input image at least in part by determining a threshold for distortion-length slope to meet a defined rate-control requirement, and selectively including coding passes that have a distortion-length slope greater than the determined distortion-length slope threshold to comprise the encoding.

11. A computer-implemented method for providing a video signal from compressed video data, the method comprising:
 receiving, by at least one hardware processor, compressed video data comprising images encoded with higher precision in one or more defined regions-of-interest of the images than outside of the defined regions-of-interest, wherein the one or more defined regions-of-interest are defined by including one or more near-limit pixels, the near-limit pixels characterized by at least one of a luma code-value within a color space by no more than a defined number of luminance units that is less than a luminance range of the color space or a chroma code-value within a color space by no more than a defined number of chroma units that is less than a chroma range of the color space, wherein the one or more regions-of-interest include all the one or more near-limit pixels in the input image;
 decoding, by the at least one hardware processor, the compressed video data thereby obtaining a video signal decoded with higher precision in the one or more defined regions-of-interest than in areas outside of the defined regions-of-interest; and
 outputting the video signal.

12. The method of claim 11, wherein the compressed video data is compressed by wavelet-based compression.

13. The method of claim 11, wherein the compressed video data is compressed by a method compliant with one of JPEG 2000 and H.264.

14. The method of claim 11, wherein the compressed video data has been encoded at least in part by selectively increasing distortion reduction for all coding passes within code-blocks contained within the region-of-interest by a factor that is greater than 1.

15. The method of claim 11, wherein the compressed video data has been encoded at least in part by determining a threshold for distortion-length slope to meet a defined rate-control requirement, and selectively including coding passes that have a distortion-length slope greater than the determined distortion-length slope threshold.

16. An apparatus comprising at least one processor coupled to a memory, wherein the memory holds instructions that when executed by the least one processor cause the apparatus to perform:
 receiving compressed video data comprising images encoded with higher precision in one or more defined regions-of-interest of the images than outside of the defined regions-of-interest, wherein the one or more defined regions-of-interest are defined by including one or more near-limit pixels, the near-limit pixels characterized by at least one of a luma code-value within a color space by no more than a defined number of luminance units that is less than a luminance range of the color space or a chroma code-value within a color space by no more than a defined number of chroma units that is less than a chroma range of the color space, wherein the one or more defined regions-of-interest include all the one or more near-limit pixels in the input image;
 decoding the compressed video data thereby obtaining a video signal decoded with higher precision in the one or more defined regions-of-interest than in areas outside of the defined regions-of-interest; and
 outputting the video signal.

17. The apparatus of claim 16, wherein the memory holds further instructions for decoding the compressed video data compressed by wavelet-based compression.

18. The apparatus of claim 16, wherein the memory holds further instructions for decoding the compressed video data that has been encoded at least in part by selectively increasing distortion reduction for all coding passes within code-blocks contained within the region-of-interest by a factor that is greater than 1.

19. The apparatus of claim 16, wherein the memory holds further instructions for decoding the compressed video data that has been encoded at least in part by determining a threshold for distortion-length slope to meet a defined rate-control requirement, and selectively including coding passes that have a distortion-length slope greater than the determined distortion-length slope threshold.

20. The apparatus of claim 16, wherein the memory holds further instructions for receiving the video data having the one or more defined regions-of-interest further defined by including one or more additional near-limit pixels each characterized by a luma code-value greater than a lower luma limit of a color space by no more than a second defined number of luminance units less than the luminance range of the color space.

* * * * *